United States Patent [19]
Kim et al.

[11] Patent Number: 6,128,474
[45] Date of Patent: Oct. 3, 2000

[54] TEST CIRCUIT OF BASE STATION FOR MOBILE RADIO COMMUNICATION SYSTEM

[75] Inventors: Bo Jong Kim; Dae Won Kim, both of Kyungki-do, Rep. of Korea

[73] Assignee: LG Information & Communications, Ltd., Seoul, Rep. of Korea

[21] Appl. No.: 08/998,774

[22] Filed: Dec. 29, 1997

[30] Foreign Application Priority Data

Dec. 30, 1996 [KR] Rep. of Korea ................. 96-77621

[51] Int. Cl.[7] .................... H04B 17/00; H04B 1/44; H04B 1/38
[52] U.S. Cl. .................... 455/67.1; 455/562; 455/78
[58] Field of Search ................. 455/67.4, 67.1, 455/562, 115, 129, 561, 78, 423

[56] References Cited

U.S. PATENT DOCUMENTS

| | | | |
|---|---|---|---|
| 3,993,999 | 11/1976 | Hemmi et al. | 342/372 |
| 4,679,248 | 7/1987 | McKeown | 455/226.1 |
| 4,704,734 | 11/1987 | Menich et al. | 455/562 |
| 4,754,496 | 6/1988 | Fishkin et al. | 455/67.5 |
| 5,175,878 | 12/1992 | Davis et al. | 455/103 |
| 5,201,063 | 4/1993 | Tam et al. | 455/67.4 |
| 5,507,010 | 4/1996 | Ahonen | 455/67.4 |
| 5,543,721 | 8/1996 | Knuuti | 324/647 |
| 5,548,820 | 8/1996 | Victorin | 455/67.4 |
| 5,574,981 | 11/1996 | Ahonen | 455/67.4 |
| 5,602,555 | 2/1997 | Searle et al. | 342/374 |
| 5,678,208 | 10/1997 | Kowalewski et al. | 455/115 |
| 5,684,491 | 11/1997 | Newman et al. | 342/374 |
| 5,831,974 | 11/1998 | Sounvieri | 370/252 |
| 5,857,012 | 1/1999 | Paul | 379/34 |
| 5,889,494 | 3/1999 | Reudink et al. | 342/373 |
| 5,898,905 | 4/1999 | Aldridge et al. | 455/67.4 |
| 5,920,813 | 7/1999 | Evans et al. | 455/422 |
| 5,924,029 | 7/1999 | Sohngen et al | 455/423 |
| 5,930,707 | 7/1999 | Vambaris et al. | 455/424 |

Primary Examiner—Reinhard J. Eisenzopf
Assistant Examiner—Charles N. Appiah
Attorney, Agent, or Firm—Fleshner & Kim, LLP

[57] ABSTRACT

A test circuit of a base station for use of a mobile radio communication system includes a terminal simulator for analyzing radio frequency signals provided from the base station and outputting the analyzed signals to an exam controller; a radio frequency signal path adjuster connected to the terminal simulator, for adjusting a combination and division of radio frequency signals, and a selection of a test path and a level of signals; and the exam controller connected with the radio frequency signal path adjuster, the terminal simulator and an upper level controller, the exam controller being for operating according to a test instruction of the upper level controller or controlling the radio frequency signal path adjuster and the terminal simulator to thereby execute a test and inform the upper level controller of the test result; whereby enabling the test circuit to be performed in a mutual test between sectors of the base station and an unmanned automation test.

11 Claims, 3 Drawing Sheets

TEST CIRCUIT OF BASE STATION FOR MOBILE RADIO COMMUNICATION SYSTEM

BACKGROUND OF THE INVENTION

1. Field of the Invention

The present invention relates to a test circuit of a base station for use of a mobile radio communication system; and, more particularly, to a test circuit of a base station for testing therein a call, a hand over, a reception sensitivity of a base station, a voltage standing-wave ratio etc.

2. Discussion of Related Art

In general, it is carried out in a base station of a mobile radio communication system a call test for clarifying whether or not a call is normally effected by using an antenna of a specific sector, a hand over test for confirming whether or not the call effected in the specific sector is transferred to another sector and the transferred call is continued, a reception sensitivity test of the base station for measuring a minimum reception level of the base station, and a test for measuring a voltage standing-wave ratio (VSWR) of the antenna, the minimum reception level being for normally effectuating the call.

FIG. 1 shows a termination of a general antenna. Referring to FIG. 1, there are constructed a directional coupler 2 and an antenna 1, wherein the directional coupler 2 includes a forward port 3 and a reverse port 4 and is coupled with a test circuit of a base station in a mobile radio communication system in order for a call testing, and the antenna 1 radiates a transmission signal and absorbs a reception signal.

FIG. 2 sets forth a block diagram illustrating a test circuit of a base station for use of a conventional mobile radio communication system. In the conventional mobile radio communication system, the test circuit of base station is concerned with three sector base station. That is, each of three sectors equips one transmitting antenna and two receiving antennae.

There is provided in FIG. 2 the construction of a base station test circuit for use of a conventional mobile radio communication system. Describing the construction, the test circuit includes a tri-state switch 18-1 to 18-3 coupled with the directional coupler 2 of transmitting alpha, beta and gamma antennae, for selecting a forward path and a reverse path in a transmission step; a three path coupler 15 connected with the tri-state switch 18-1 to 18-3, for joining signals from the tri-state switch 18-1 to 18-3; a transmitting attenuator 13 connected with the three path coupler 15 and a duplexer 12, for adjusting a level of a transmission signal; the duplexer 12 connected with the transmitting attenuator 13, a receiving attenuator 14 and a mobile terminal 21, for assorting transmission and reception signals; the receiving attenuator 14 connected to the duplexer 12, for adjusting a level of a reception signal; a two path divider 16 connected to the receiving attenuator 14, for dividing reception signals between two paths; a three path divider 17-1 and 17-2 connected to the two path divider 16, for dividing reception signals among three paths; a tri-state switch 19-1 connected with the three path divider 17-1 and a directional coupler of a first receiving alpha antenna, for selecting one path between forward and reverse paths in a receiving step; a tri-state switch 19-2 connected with the three path divider 17-1 and the directional coupler of a first receiving beta antenna, for choosing one path between forward and reverse paths in a receiving step; a tri-state switch 19-3 connected with the three path divider 17-1 and the directional coupler of a first receiving gamma antenna, for picking up one path between forward and reverse paths in a receiving step; a tri-state switch 20-1 connected with the three path divider 17-2 and a directional coupler of a second receiving alpha antenna, for choosing one path between forward and reverse paths in a receiving step; a tri-state switch 20-2 connected with the three path divider 17-2 and the directional coupler of a second receiving beta antenna, for selecting one path between forward and reverse paths in a receiving step; and a tri-state switch 20-3 connected with the three path divider 17-2 and the directional coupler of a first receiving gamma antenna, for selecting one path between forward and reverse paths in a receiving step.

Terms such as a transmission and a reception represent herein a transmission direction of signals centering around the base station. A forward direction indicates that a signal is transmitted from the base station to an antenna, and a reverse direction signifies a transmission of a signal from an antenna to the base station.

In the test circuit of base station having such construction, for use of the conventional mobile radio communication system, the tri-state switches 18-1 to 18-3, 19-1 to 19-3 and 20-1 to 20-3 are connected with forward and reverse ports included into the directional coupler of an antenna to be tested. In such connecting construction, various tests, e.g., the call test, the hand over test, the base station's receiving sensitivity test, the voltage standing-wave ratio test, etc., are executed by using a terminal equipment.

In executing the test through a use of the test circuit of the base station in such conventional mobile radio communication system, a level of a radio frequency transmission signal or reception signal is attenuated for 3 sectors not a unit of 1 sector. Thus, it is impossible to process the radio frequency signal as an independent attenuation signal and thereby perform a mutual test between sectors. An unmanned automatic test can not be further carried out since signals of respective sectors should be separately adjusted in the construction of an existing radio frequency path adjuster.

SUMMARY OF THE INVENTION

Accordingly, the present invention is directed to a test circuit of a base station that substantially obviates one or more of the problems due to limitations and disadvantages of the related art.

An object of the present invention is to provide a test circuit of a base station for use of a mobile radio communication system, which is capable of executing a mutual test between respective sectors and an unmanned automatic test.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a test circuit of a base station for use of a mobile radio communication system is provided including: a radio frequency signal path adjuster having switches connected with each of directional couplers and transmitting/receiving antennae of the base station and a path attenuator for respectively attenuating transmitting/receiving paths within an operational range of the base station, the switches being for selecting and testing an antenna of a desired sector, wherein the radio frequency signal path adjuster adjusts an insulation and an attenuation path of each radio frequency signal from the base station; a terminal simulator for respectively analyzing the radio frequency signal provided from the base station and transmission/reception signals through forward or reverse path of the radio frequency signal path adjuster; and an exam controller for selecting a test path by a test instruction of an upper level controller according to selected test sorts and outputting a control signal in order to analyze the transmission/reception signals of the terminal simulator and the radio frequency signal.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

Figure 1:
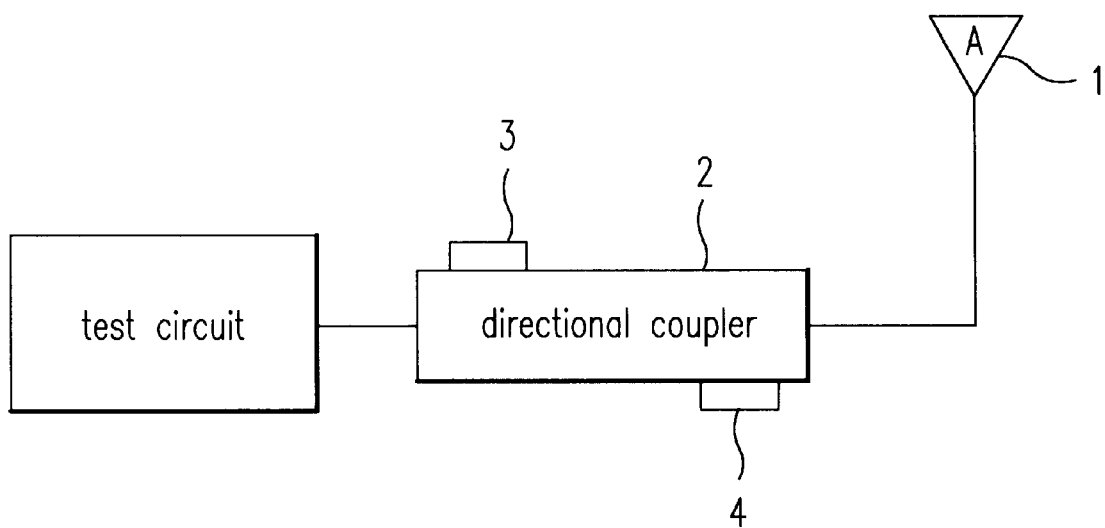
FIG. 1 depicts a termination of a general antenna.
Figure 2:
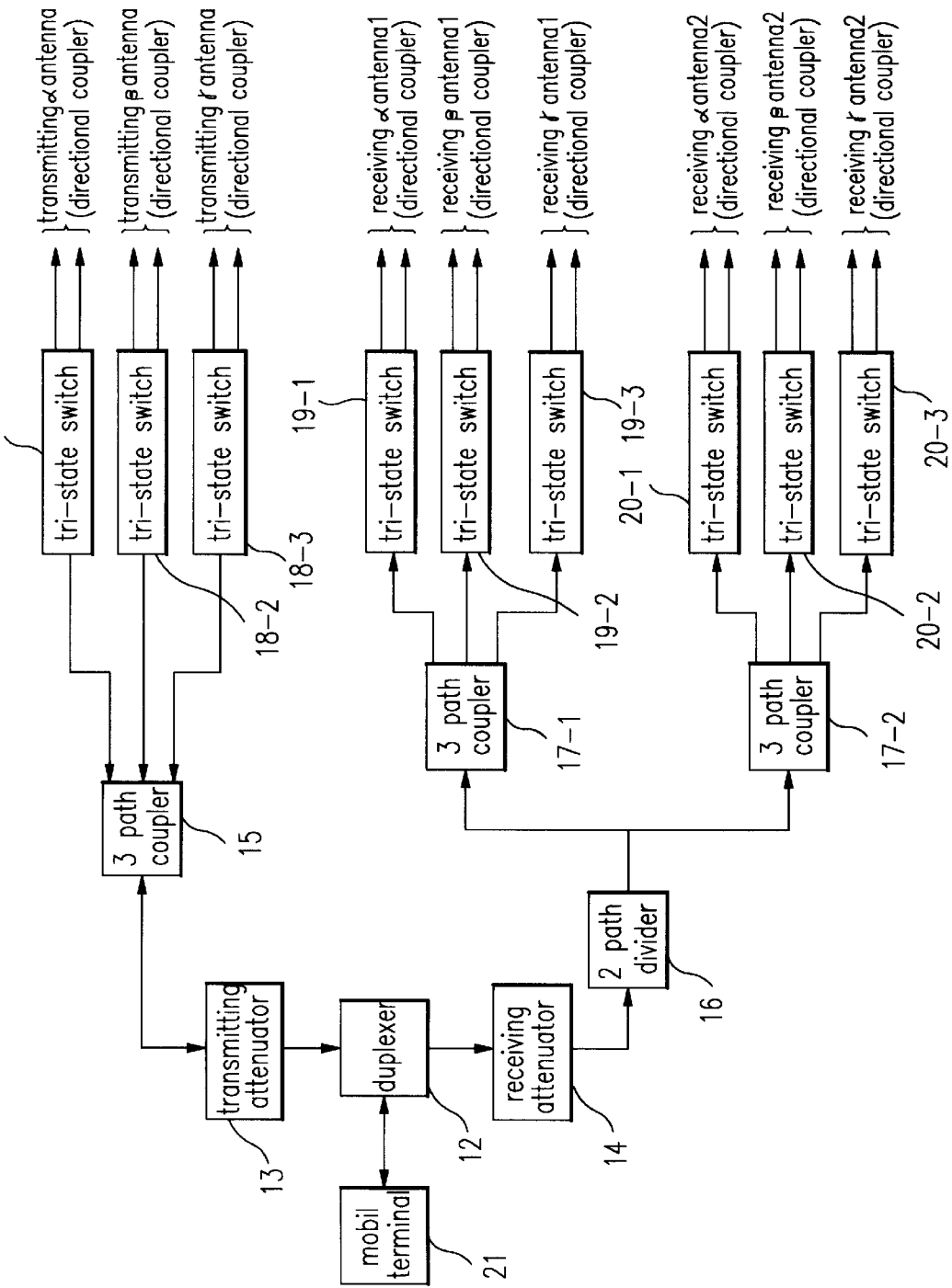
FIG. 2 illustrates a block diagram showing a test circuit of a base station for use of a conventional mobile radio communication system.
Figure 3:
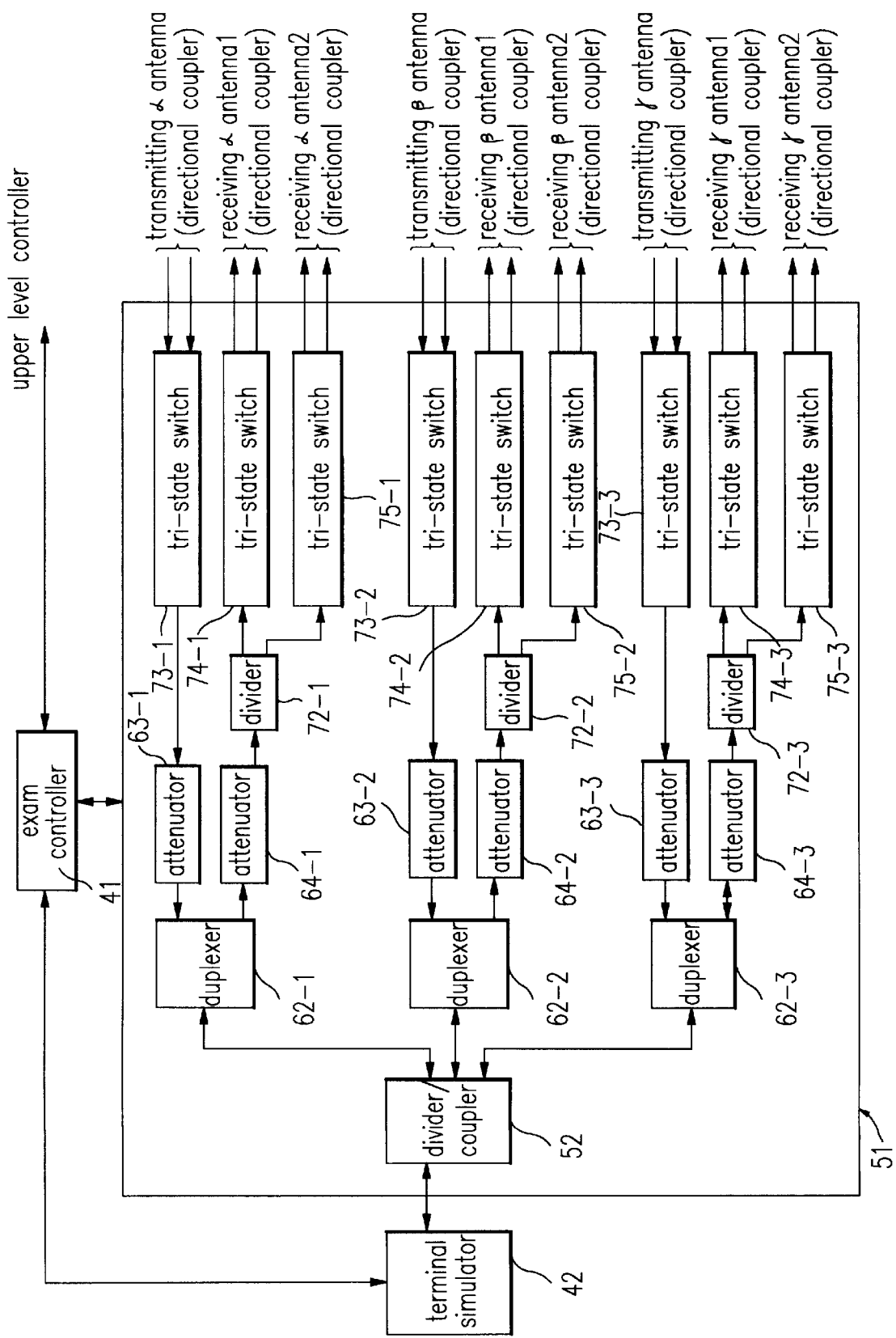

FIG. 3 sets forth a block diagram representing a test circuit of a base station for use of a mobile radio communication system in accordance with the present invention.

DETAILED DESCRIPTION OF PREFERRED EMBODIMENT

Reference will now be made in detail to the preferred embodiments of the present invention, examples of which are illustrated in the accompanying drawings.

FIG. 3 presents a block diagram depicting a test circuit of a base station in a mobile radio communication system in accordance with the present invention.

Referring to FIG. 3, the test circuit of the base station includes switches connected each of directional couplers of transmitting/receiving alpha, beta and gamma antennae in the base station, for selecting and testing an antenna of a desired sector; and a path attenuator for respectively attenuating transmitting/receiving paths within an operational range of the base station. Such test circuit is also constructed by: a radio frequency signal path adjuster 51 for adjusting an insulation of radio frequency signals from each base station and an attenuation path; a terminal simulator 42 for analyzing the radio frequency signal from the base station; and an exam controller 41 for selecting a test path based on a test instruction of an upper level controller (not shown) according to selected test sorts and outputting a control signal in order to analyze the transmission/reception signals of the terminal simulator 42.

The radio frequency signal path adjuster 51 includes a divider/coupler connected to the terminal simulator, for combining or assorting signals in a transmitting/receiving steps; three duplexers for separating each of transmission and reception signals from the transmitting/receiving alpha, beta and gamma antennae of the base station; a plurality of attenuators connected with each of the duplexers, for adjusting an attenuation level of the transmission and reception signals; a tri-state switch for selecting transmitting and receiving paths by a control of the exam controller in a transmitting step, through a connection to one attenuator, and choosing one path between forward and reverse paths in a transmitting step, through a connection with a first path selection switch and a directional coupler of a transmitting antenna; a divider connected to another attenuator, for assorting signals in a receiving step; a multiple number of path selection switches connected to the divider, for selecting transmitting/receiving paths and a receiving antenna under a control of the exam controller; and a plurality of tri-state switches connected with a multiple number of path selection switches and a directional coupler of a receiving antenna, for choosing each of forward and reverse paths in a receiving step; wherein a plurality of tri-state switches are correspondingly connected with each of directional couplers of transmitting/receiving alpha, beta and gamma antennae in the base station.

A first radio frequency signal path adjuster is constructed by a divider/coupler 52 connected to the terminal simulator 42, for combining signals in a transmitting step or dividing signals in a receiving step; a duplexer 62-1 connected to the divider/coupler 52, for dividing signals into a transmission signal and a reception signal; attenuators 63-1 and 64-1 respectively connected to the duplexer 62-1, for adjusting a level of the transmission and reception signals; a tri-state switch 73-1 for selecting one path between transmitting and receiving paths by a control of the exam controller 41 in a transmitting step, through a connection to the attenuator 63-1, and choosing one path between forward and reverse paths in a transmitting step, through a connection to a directional coupler of a transmitting alpha antenna; a divider 72-1 connected to the attenuator 64-1, for dividing signals in a receiving step; and tri-state switches 74-1 and 75-1 respectively connected to the divider 72-1, for choosing transmitting/receiving paths and a receiving antenna under a control of the exam controller 41; wherein the tri-state switch 74-1 is connected to a directional coupler of a first reception alpha antenna and selects forward and reverse paths in a receiving step, the tri-state switch 75-1 is connected to a directional coupler of a second reception alpha antenna and chooses forward and reverse paths in a receiving step.

A second radio frequency signal path adjuster is made up of a duplexer 62-2 connected to the divider/coupler 52, for dividing signals into a transmission signal and a reception signal; attenuators 63-2 and 64-2 respectively connected to the duplexer 62-2, for adjusting a level of the transmission and reception signals; a tri-state switch 73-2 for selecting transmitting and receiving paths by a control of the exam controller 41 in a transmitting step, through a connection to the attenuator 63-2, and choosing forward and reverse paths in a transmitting step, through a connection to a directional coupler of a transmitting beta antenna; a divider 72-2 connected to the attenuator 64-2, for dividing signals in a receiving step; and tri-state switches 74-2 and 75-2 respectively connected to the divider 72-2, for choosing transmitting/receiving paths and a receiving antenna under a control of the exam controller 41; wherein the tri-state switch 74-2 is connected to a directional coupler of a first reception beta antenna and selects forward and reverse paths in a receiving step, the tri-state switch 75-2 is connected to a directional coupler of a second reception beta antenna and chooses forward and reverse paths in a receiving step.

A third radio frequency signal path adjuster includes: a duplexer 62-3 connected to the divider/coupler 52, for assorting transmission and reception signals; attenuators 63-3 and 64-3 respectively connected to the duplexer 62-3, for adjusting a level of the transmission and reception signals; a tri-state switch 73-3 for selecting transmitting and receiving paths by a control of the exam controller 41 in a transmitting step, through a connection to the attenuator 63-3, and choosing forward and reverse paths in a transmitting step, through a connection to a directional coupler of a transmitting gamma antenna; a divider 72-3 connected to the attenuator 64-3, for dividing signals in a receiving step; and tri-state switches 74-3 and 75-3 respectively connected to the divider 72-3, for choosing transmitting/receiving paths and a receiving antenna under a control of the exam controller 41; wherein the tri-state switch 74-3 is connected to a directional coupler of a first reception gamma antenna and selects forward and reverse paths in a receiving step, the tri-state switch 75-3 is connected to a directional coupler of a second reception gamma antenna and chooses forward and reverse paths in a receiving step.

As afore-mentioned, the first to third radio frequency signal path adjusters 51 with such construction are commonly connected with the terminal simulator 42 and the exam controller 41, to thereby inform the upper level controller of test results got from each of transmitting/receiving antennae and the directional couplers subject to a test instruction of the upper level controller.

The test of the base station in the mobile radio communication system of the invention is executed as follows.

First, the exam controller 41 controls the tri-state switches (73-1, 74-1, 75-1)(73-2, 74-2, 75-2)(73-3, 74-3, 75-3), to thus select each of the test path and the receiving antenna. The exam controller 41 also controls the attenuators (63-1, 64-1)(63-2, 64-2)(63-3, 64-3), to thereby determine an attenuation value matched with a selected test path.

Next, the exam controller 41 then selects a sort of the test and controls the terminal simulator 42, to thereby determine a telephone call or allow a test signal to be provided.

Thereafter, the terminal simulator 42 analyzes a transmission or reception signal etc. and informs the exam controller 41 of its result. The exam controller 41 provides the upper level controller with the test result, and such series of tests is progressed.

As afore-mentioned, in accordance with the present invention, a level of a radio frequency transmission or reception signal is adjusted to the unit of 1 sector and the exam controller is connected to the upper level controller, to thereby execute a mutual test between sectors and an unmanned automation test.

It will be apparent to those skilled in the art that various modifications and variations can be made in the test circuit of base station of the present invention without departing from the spirit or scope of the invention. Thus, it is intended that the present invention cover the modifications and variations of this invention provided they come within the scope of the appended claims and their equivalents.

What is claimed is:

1. A test circuit, comprising:
   a first switching unit for coupling with a first antenna group having a first geographic sector of coverage, the first antenna group transmitting and receiving signals;
   a second switching unit for coupling with a second antenna group having a second geographic sector of coverage, the second antenna group transmitting and receiving signals;
   a first attenuator unit coupled to the first switching unit for transmitting and receiving signals to and from the first switching unit; and
   a second attenuator unit coupled to the second switching unit for transmitting and receiving signals to and from the second switching unit, wherein each antenna group comprises a transmitting antenna and first and second receiving antennas, and each switching unit comprises a first switch coupled to the corresponding transmitting antenna, a second switch coupled to the corresponding second receiving antenna, and a third switch coupled to the corresponding second receiving antenna, and wherein each of the attenuator units comprises a first attenuator coupled to the corresponding first switch, and a second attenuator coupled to the corresponding second and third switches through a divider.

2. The test circuit of claim 1, further comprising:
   a third switching unit for coupling with a third antenna group having a third geographic sector of coverage, the third antenna group transmitting and receiving signals; and
   a third attenuator unit coupled to the third switching unit for transmitting and receiving signals to and from the third switching unit.

3. The test circuit of claim 1, further comprising:
   an interface unit to transmit input signals to and receive output signals from the first and second attenuators of each of the attenuator units; and
   a terminal simulator coupled to the interface unit, the terminal simulator providing the input signal to and receiving the output signal from the interface unit, and analyzing the input and output signals.

4. The test circuit of claim 3, further comprising a controller coupled to the terminal simulator, each of the attenuator units, and each of the switching units, the controller selecting a switching unit and attenuator unit so as to determine a test path and an attenuation value, and controlling the operation of the terminal simulator.

5. The test circuit of claim 4, wherein the interface unit comprises:
   a divider-coupler coupled to the terminal simulator;
   a first duplexer coupled to the first and second attenuators of the first attenuator unit; and
   a second duplexer coupled to the first and second attenuators of the second attenuator unit, wherein the divider-coupler receives and divides an input signal from the terminal simulator and outputs first and second input signals to the first and second duplexers, respectively, and receives first and second output signals from the first and second duplexers, respectively, and combines them into an output signal.

6. The test circuit of claim 5, further comprising:
   a third switching unit for coupling with a third antenna group having a third geographic sector of coverage, the third antenna group transmitting and receiving signals;
   a third attenuator unit coupled to the third switching unit for transmitting and receiving signals to and from the third switching unit, the third attenuator unit having first and second attenuators; and
   a third duplexer coupled to the first and second attenuators of the third attenuator unit and to the divider-coupler, wherein the third duplexer receives and input from the divider coupler and transmits it to the first attenuator of the third attenuator unit and receives and output from the second attenuator of the third attenuator unit and transmits it to the divider-coupler.

7. The test circuit of claim 2, further comprising:
   a terminal simulator for providing, receiving, and analyzing test signals; and
   a controller coupled to the terminal simulator, each of the attenuator units, and each of the switching units, the controller selecting a switching unit and attenuator unit so as to determine a test path and an attenuation value, and controlling the test mode.

8. The test circuit of claim 7, further comprising an interface unit coupling the terminal simulator to each of the attenuator units.

9. The test circuit of claim 8, wherein the interface unit comprises:

a divider-coupler coupled to the terminal simulator;

a first duplexer coupled to the first and second attenuators of the first attenuator unit;

a second duplexer coupled to the first and second attenuators of the second attenuator unit; and a third duplexer coupled to the first and second attenuators of the third attenuator unit; wherein the divider-coupler receives and divides an input signal from the terminal simulator and outputs first, second, and third input signals to the first, second, and third duplexers, respectively, and receives first, second, and third output signals from the first, second, and third duplexers, respectively, and combines them into an output signal.

10. A test circuit of a base station in a mobile radio communication system, comprising:

an exam controller for outputting a first control signal for selecting a sector antenna of a plurality of sector antennae and a second control signal for selecting a path from a forward path and a reverse path by a remote control signal provided from an upper level controller;

a radio frequency signal path adjuster for selecting a traffic path to adjust a level of a radio frequency signal transmitted or received by a sector unit;

a terminal simulator for analyzing the radio frequency signal provided from the radio frequency signal path adjuster transmitted or received and determining test sorts in accordance with the second control signal, wherein the radio frequency signal path adjuster comprises a plurality of switches, coupled with each sector antenna of a base station distinguished by sector unit, for selecting a test sector antenna from the plurality of sector antennae in accordance with the first control signal, and a plurality of path attenuators for attenuating the radio frequency signal transmitted or received along the selected antenna sector within an operational range of the base station.

11. The test circuit of claim 10, wherein the radio frequency signal path adjuster further comprises:

a divider/coupler, coupled to the terminal simulator, for combining or separating the radio frequency signal;

a plurality of duplexers, commonly coupled to the divider/coupler and coupled with pairs of path attenuators of the plurality of path attenuators, for separating each of the radio frequency signal provided from the plurality of sector antennae of the base station; and a plurality of dividers, coupled with each attenuator operating in reverse link, for separating signals on receiving the radio frequency signal.

* * * * *